US009979555B2

United States Patent
Shirakawa et al.

(10) Patent No.: US 9,979,555 B2
(45) Date of Patent: May 22, 2018

(54) COMMUNICATION MONITORING DEVICE

(71) Applicant: Hitachi Metals, Ltd., Tokyo (JP)

(72) Inventors: Yohei Shirakawa, Hitachi (JP); Koki Hirano, Hitachinaka (JP)

(73) Assignee: HITACHI METALS, LTD., Tokyo (JP)

( * ) Notice: Subject to any disclaimer, the term of this patent is extended or adjusted under 35 U.S.C. 154(b) by 154 days.

(21) Appl. No.: 15/203,009

(22) Filed: Jul. 6, 2016

(65) Prior Publication Data

US 2017/0012789 A1    Jan. 12, 2017

(30) Foreign Application Priority Data

Jul. 7, 2015   (JP) .................................. 2015-136312

(51) Int. Cl.
*H04L 12/10* (2006.01)
*H01R 24/64* (2011.01)
*H01R 107/00* (2006.01)

(52) U.S. Cl.
CPC .............. *H04L 12/10* (2013.01); *H01R 24/64* (2013.01); *H01R 2107/00* (2013.01)

(58) Field of Classification Search
CPC ...... H04L 12/10; H01R 24/64; H01R 2107/00
See application file for complete search history.

(56) References Cited

U.S. PATENT DOCUMENTS

| 2010/0120264 A1 | 5/2010 | Caveney et al. |
| 2010/0184323 A1 | 7/2010 | Patel et al. |
| 2013/0012043 A1 | 1/2013 | Patel et al. |
| 2013/0217249 A1 | 8/2013 | Patel et al. |
| 2014/0080354 A1 | 3/2014 | Caveney et al. |
| 2015/0350013 A1 | 12/2015 | Cavenet et al. |

FOREIGN PATENT DOCUMENTS

| JP | 2012-508956 A | 4/2012 |
| WO | WO 2010/056821 A1 | 5/2010 |

*Primary Examiner* — Robert Deberadinis
(74) *Attorney, Agent, or Firm* — McGinn IP Law Group, PLLC

(57) ABSTRACT

A communication monitoring device includes, a first voltage application circuit 5, mounted on a first connector portion 2b arranged at one end of a communication cable 2 having at least two signal lines 2a, or a first repeater 3 or a first communication device, connecting the first connector portion 2b, wherein the first voltage application circuit 5 applies an alternating current voltage at a predetermined frequency to between any signal lines 2a in the communication cable 2, and a second display portion 6, mounted on a second connector portion 2c arranged at an other end of the communication cable 2, or a second repeater 4 or a second communication device, connecting the second connector portion 2c, wherein the second display portion 6 detects and displays the alternating current voltage at the predetermined frequency applied to between the any signal lines 2a in the communication cable 2.

7 Claims, 3 Drawing Sheets

COMMUNICATION MONITORING DEVICE

The present application is based on Japanese patent application No. 2015-136312 filed on Jul. 7, 2015, the entire contents of which are incorporated herein by reference.

BACKGROUND OF THE INVENTION

1. Field of the Invention

The invention relates to a communication monitoring device.

2. Description of the Related Art

A communication monitoring device may fail to identify a connection destination of a communication cable where is connected, for example, in case of using multiple communication cables or laying multiple communication cables having long length under a floor.

In this case, it may be difficult to identify the connection destination of any one of the communication cables, whereby problems such as erroneous removal or misconnection may arise.

As a solution for the problem, a method is known which is adapted for identifying the connection destination of the communication cable by using a signal line for identifying which is separately added to a signal line for transmitting signal.

Further, the prior art document information relevant to the invention may include JP-A-2012-508956.

SUMMARY OF THE INVENTION

If the identifying signal line is additionally used, versatile communication cables cannot be used and therefore the cost of the total system become expensive.

On the other hand, PoE (Power over Ethernet, where Ethernet is known as the resisted trade mark) that also sends direct current through the communication cable prevails in recent years. It is desired to construct a system that can apply to the PoE.

It is an object of the invention to provide a communication monitoring device that can identify the connection destination of the communication cable while using the versatile communication cable, and also send direct current through the communication cable.

[1] According to an embodiment of the invention, a communication monitoring device comprises:

a first voltage application circuit, mounted on a first connector portion arranged at one end of a communication cable having at least two signal lines, or on a first repeater or a first communication device, connecting the first connector portion, wherein the first voltage application circuit applies an alternating current voltage at a predetermined frequency to between any signal lines in the communication cable; and a second display portion, mounted on a second connector portion arranged at the other end of the communication cable, or on a second repeater or a second communication device, connecting the second connector portion, wherein the second display portion detects and displays the alternating current voltage at the predetermined frequency applied to between any signal lines in the communication cable.

[2] The communication monitoring device defined by [1] may further comprise a first display portion mounted on the first connector portion, the first repeater or the first communication device, wherein the first display portion detects and displays the alternating current voltage at the predetermined frequency applied to between the any signal lines in the communication cable.

[3] The communication monitoring device defined by [1] or [2] may further comprise a second voltage application circuit mounted on the second connector portion, the second repeater or the second communication device, wherein the second voltage application circuit applies the alternating current voltage at the predetermined frequency to between the any signal lines in the communication cable.

[4] The communication monitoring device defined by any one of [1] to [3] may be wherein the first voltage application circuit comprises a plurality of first voltage application circuits that are mounted on the first repeater or the first communication device, having ports to connect the communication cable, with respect to each port, and applies the alternating current voltages at the different frequencies with respect to the each port, and wherein the second display portion comprises a plurality of second display portions that are mounted on the second repeater or the second communication device, having ports being connected with the communication cable, with respect to each port, and displays different indications with respect to the different frequencies of the alternating current voltage applied at between the any signal lines in the communication cable.

[5] The communication monitoring device defined by any one of [1] to [4] may further comprise a first filter arranged in the first connector portion, the first repeater or the first communication device, wherein the first filter suppresses an alternating current voltage applied by the first voltage application circuit with outputting forward a transmission line being opposite side of the communication cable; and a second filter arranged in the second connector portion, the second repeater or the second communication device, wherein the second filter suppresses the alternating current voltage applied by the first voltage application circuit with outputting forward a transmission line being opposite side of the communication cable.

[6] The communication monitoring device defined by any one of [1] to [5] may be wherein a frequency of an alternating current voltage applying to between the any lines in the communication cable is lower than a frequency of an electric signal transmitted in the communication cable.

[7] The communication monitoring device defined by any one of [1] to [6] may further comprise a power feeding device arranged separately from the first connector portion, the first repeater, or the first communication device, mounted on the first voltage application circuit, wherein the first voltage application circuit applies the alternating current voltage at a predetermined frequency toward between any signal lines in the communication cable with supplied power from the power feeding device.

Effects of the Invention

According to an embodiment of the invention, a communication monitoring device can be provided that can identify the connection destination of the communication cable while using the versatile communication cable, and also send direct current through the communication cable.

BRIEF DESCRIPTION OF THE DRAWINGS

Next, the present invention will be explained in more detail in conjunction with appended drawings, wherein.

DETAILED DESCRIPTION OF THE PREFERRED EMBODIMENTS

Next, embodiments according to the invention will be described below with reference to accompanying drawings.

Figure 1A:
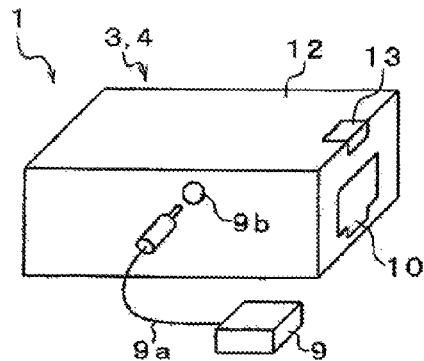
FIG. 1A is a perspective view showing a repeater mounting a communication monitoring device in an embodiment according to the invention.
Figure 1B:
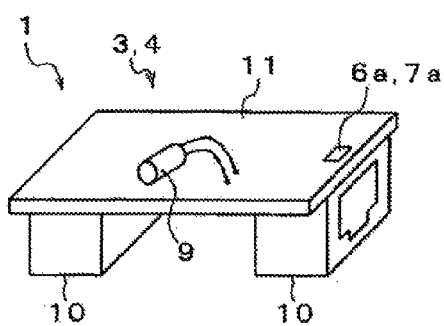
FIG. 1B is a perspective view showing the repeater without a housing of the repeater in the communication monitoring device in the embodiment according to the invention.
Figure 1C:
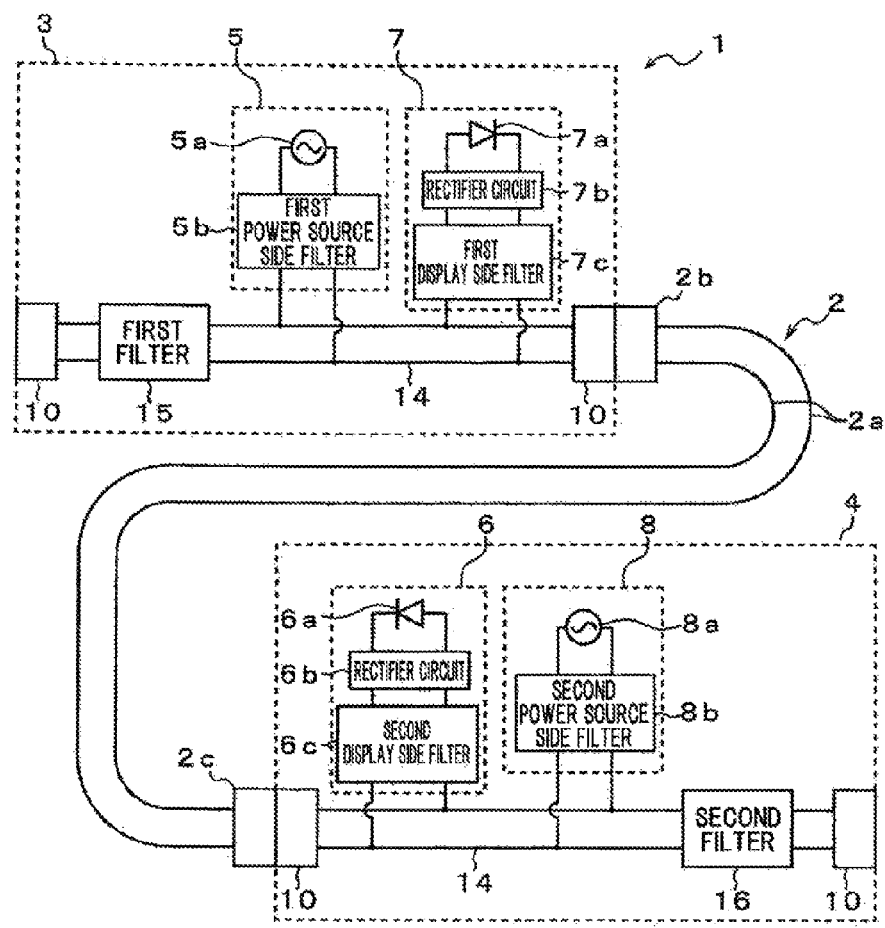
FIG. 1C is an illustration diagram showing the connection of two repeaters through a communication cable in the communication monitoring device in the embodiment according to the invention.

FIG. 1A is a perspective view showing a repeater mounting a communication monitoring device in the embodiment according to the invention. FIG. 1B is a perspective view showing the repeater without a housing of the repeater in the communication monitoring device in the embodiment according to the invention. FIG. 1C is an illustration diagram showing the connection of two repeaters through a communication cable in the communication monitoring device in the embodiment according to the invention.

As shown in FIG. 1A, FIG. 1B, and FIG. 1C, a communication monitoring device 1 comprises a first voltage application circuit 5 mounted on a first repeater 3 connected with a first connector portion 2b arranged at one end of a communication cable 2 having at least two signal lines 2a, and a second display portion 6 mounted on a second repeater 4 connected with a second connector section 2c arranged at the other end of the communication cable 2.

A cable commonly used as a LAN (Local Area Network) cable may be used as the communication cable 2. In the present embodiment, it is needed to use a cable having at least the two signal lines 2a as the communication cable 2. In this case, a cable having four pairs (i.e. eight in total) of the signal lines 2a as the communication cable 2 is used. FIG. 1A shows only one of the four pairs of the signal lines 2a.

The repeaters 3 and 4 are used for connecting the communication cables 2, and comprise two connectors 10, a circuit board 11 which mounts the connector 10, and a housing 12 provided so as to cover the circuit board 11. The housing 12 has a display window 13 to be recognized visually a lightning of LEDs (Light Emitting Diodes) 6a, 7a described below for operator.

A transmission line 14 connecting each of electrodes (terminals) corresponding to the connector 10 is formed on the circuit board 11. In this case, as the communication cable 2 having four pairs of the signal lines 2a is adopted, four pairs (eight in totally) of the transmission lines 14 are formed on the circuit board 11. Moreover, FIG. 1C shows only one of the four pairs of the transmission lines 14.

The first voltage application circuit 5 is mounted on the circuit board 11 of the first repeater 3. The second display portion 6 is mounted on the circuit board 11 of the second repeater 4.

The first voltage application circuit 5 is arranged so as to apply an alternate current voltage at a predetermined frequency f1 toward between any pair of the signal lines 2a in the communication cable 2.

The first voltage application circuit 5 comprises a first oscillator 5a to oscillate the alternating current signal at a frequency f1, which is sine wave, and a first power source side filter 5b to pass only the alternating current signal at the frequency f1. An output of the first oscillator 5a is connected toward the transmission line 14 through the first power source side filter 5b. The first power source side filter 5b suppresses outputting an electric signal being transmitted in the communication cable 2 forward inside of the first oscillator 5a.

In the present embodiment, the communication monitoring device 1 comprises additionally a power feeding device 9 which is arranged separately from the first repeater 3 on which the first voltage application circuit 5 is mounted. The power feeding device 9 feeds power toward the first voltage application circuit 5 by using wired power feeding or wireless power feeding. And the first voltage application circuit 5 is configured so as to run by being fed power from the power feeding device 9. As the present embodiment described below, a second voltage application circuit 8 is mounted on the second repeater 4. The second voltage application circuit 8 is also configured so as to run by being fed power from the power feeding device 9. In the present embodiment, as the power feeding device 9 is configured to feed power by using wired power feeding, both of the repeaters 3 and 4 are configured a power feeding connector 9b to connect a power feeding line 9a extended from the power feeding device 9.

In the first repeater 3, a first filter 15 is arranged on the transmitting line 14 where is the opposite side of the communication cable 2 with a junction with the first voltage application circuit 5, which suppresses outputting the alternating current voltage applied from the first voltage application circuit 5 forward a transmission path where is arranged in the opposite side to the communication cable 2. In this case, the first filter 15 is configured so as to cut the alternating current signal at the frequency f1.

The second display portion 6 serves to detect and display the alternate current voltage at the predetermined frequency f1 applied between the any pair of the signal lines 2a in the communication cable 2.

The second display portion 6 comprises a second display side filter 6c to pass only the alternating current signal at the frequency f1, which is connected toward the transmission lines 14 in the second repeater 4, a second rectifier circuit 6b to rectify the alternating current signal passed through the second display side filter 6c for a direct current, and an LED 6a being emitted by the direct current outputted from the second rectifier circuit 6b.

In the second repeater 4, a second filter 16 is arranged on the transmitting line 14 where is an opposite side of the communication cable 2 with a junction with the second display portion 6, which suppresses outputting the alternating current voltage applied from the first voltage application circuit 5 forward a transmission path where is in the opposite side to the communication cable 2. In this case, the second filter 16 is configured so as to cut the alternating current signal at the frequency f1.

According to the configuration described above, the alternating current signal outputted from the first oscillator 5a in the first voltage application circuit 5 is input toward the transmission line 14 in the first repeater 5 through the first power source side filter 5b. Then the alternating current signal is input toward the second repeater 4 through the communication cable 2. The alternating current signal inputted in the second repeater 4 pass through the transmission line 14 in the second repeater 4 and the second display side filter 6c. Then the alternating current signal is input in the second rectifier circuit 6b to rectify. The alternating current signal being rectified is input toward the LED 6a. Then the LED 6a emits. In addition, as the power feeding device 9 feeds power toward the first repeater 3 which is connected toward one end of the cable 2, the LED 6a emits in the second repeater 4 which is connected toward the other end of the cable 2. It makes available to confirm a connection destination of the communication cable 2.

In the present embodiment, the first repeater 3 further comprises a first display portion 7 to identify and display applying the alternate current voltage at the predetermined frequency f1 through between the any pair of the signal lines 2a in the communication cable 2.

The configuration of the first display portion 7 is similar to the configuration of the second display portion 6. The first display portion 7 comprises a first display side filter 7c to pass only the alternating current signal at the frequency f1, a first rectifier circuit 7b to rectify the alternating current signal passed through the first display side filter 7c for a direct current, and an LED 7a emitted by the direct current output from the first rectifier circuit 7b.

As the first repeater 3 comprises the first display portion 7, by feeding power to the first repeater 3 from the power feeding device 9, both the LED 7a mounted on the first repeater 3 and the LED 6a mounted on the second repeater 4 emit. It makes more available to confirm the connection destination of the communication cable 2.

Moreover, in the present embodiment, the second repeater 4 comprises additionally a second voltage application circuit 8 to apply the alternating current voltage at the predetermined frequency f1 forward between the any pair of the signal lines 2a in the communication cable 2.

A configuration of the second voltage application circuit 8 is similar to the configuration of the first voltage application circuit 5. The second voltage application circuit 8 comprises a second oscillator 8a to oscillate the alternating current signal at the frequency f1, which is sine wave, and a second power source side filter 8b to pass only the alternating current signal at the frequency f1. An output of the second oscillator 8a is connected toward the transmission line 14 through the second power source side filter 8b.

According to the second repeater 4 comprises the second voltage application circuit 8 and the first display portion 7, as the power feeding device 9 connects forward the second repeater 4, the LED 7a mounted on the first repeater 3 can be emitted. Thus the connection destinations of the communication cable 2 can be confirmed from both ends of the communication cable 2. Also, as the configuration of the first and second voltage application circuits 5 and 8, and the configuration of the first and second display portions 6 and 7 are similar, same configurations for both of the repeaters 3 and 4 can be adopted. And it is contribute to decrease a cost to produce the repeaters 3 and 4.

Both of the frequencies f1 of the alternating current voltage which are output from the voltage application circuits 5 and 8 need to differ from a frequency of an electric signal fc which is transmitted in the communication cable 2.

It is preferable that the frequency f1 is as small (low) as possible. And it is preferable that the frequency f1 is smaller (lower) than the frequency of the electric signal fc. As the frequency f1 makes small, a transmission loss in transmitting through the communication cable 2 and a power consumption can be reduced.

Further, in the present embodiment, although it is similar to both of the frequencies of the alternating current voltage which both of the voltage application circuits 5 and 8 output, both of the frequencies may be differed each other. In this case, the frequency of the first voltage application circuit 5 defines f1, and the frequency of the second voltage application circuit 8 defines f2. The first power source side filter 5b is configured so as to pass only the alternating current signal at the frequency f1. And the second power source side filter 8b is configured so as to pass only an alternating current signal at a frequency f2. The first display side filter 7c is preferably configured so as to pass only the alternating current signal at the frequency f2 (or f1 and f2), and the second display side filter 6c is preferably configured so as to pass only the alternating current signal at the frequency f1 (or f1 and f2). In this case, the first and second filters 15 and 16 are configured so as to cut the alternating current signals at both of the frequencies f1 and f2.

Moreover, although not shown in the FIG. 1C, as the display portions 6 and 7 adopt the LEDs 6a and 7a, the display portions 6 and 7 may comprise current regulation circuits to regulate the currents forward the LEDs 6a and 7a. A specific configuration of the current regulation circuits is not limited thereto, for example, it is preferable to configure the current regulation circuits by connecting the LEDs 6a or 7a, and DC-DC converters or constant-current diodes in serial, or connecting the LEDs 6a or 7a, and Zener diodes in parallel.

In the above description, the communication monitoring device 1 according to the present embodiment comprises the first voltage application circuit 5 to apply the alternating current voltage at the predetermined frequency f1 toward between the any pair of the signal lines 2a, which is mounted on the first repeater 3 to which the first connector portion 2b arranged at the one end of the communication cable 2 is connected, and the second display portion 6 to identify and display applying the alternate current voltage at the predetermined frequency f1 through between the any pair of the signal lines 2a in the communication cable 2, which is mounted on the second repeater 4 to which the second connector portion 2c arranged at the other end of the communication cable 2 is connected.

According to the configuration described above, the connection destination of the communication cable 2 can be identified while using the versatile communication cable 2 and without adding a signal line for distinction conventionally. Miss-exception or misconnection of the communication cable 2 can be reduced with low cost.

Incidentally, as the communication monitoring device 1 adopts a direct current voltage to identify the connection destination, the communication monitoring device 1 needs an element to cut the direct current voltage and cannot apply to PoE. In contrast, in the present embodiment, as the communication monitoring device 1 adopts the alternating current voltage to identify the connection destination, the communication monitoring device 1 can apply to PoE and can transmit the direct current voltage through the communication cable 2.

Moreover, in the present embodiment, as a configuration of the communication monitoring device 1 has being emitted the LED 6a in the second display portion 6 by the voltage applied from the first voltage application circuit 5, a control portion such as IC (Integrated Circuit) is not necessary. And the communication monitoring device 1 can be produced with low costs.

Next, other embodiments according to the invention will be described below.

Figure 2A:
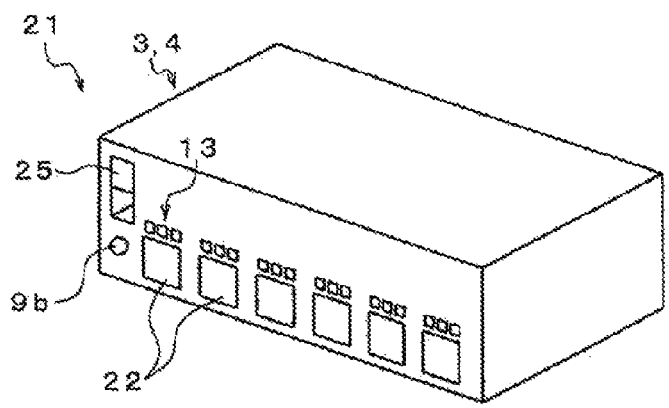
FIG. 2A is a perspective view showing a repeater mounting the communication monitoring device in another embodiment according to the invention.
Figure 3:
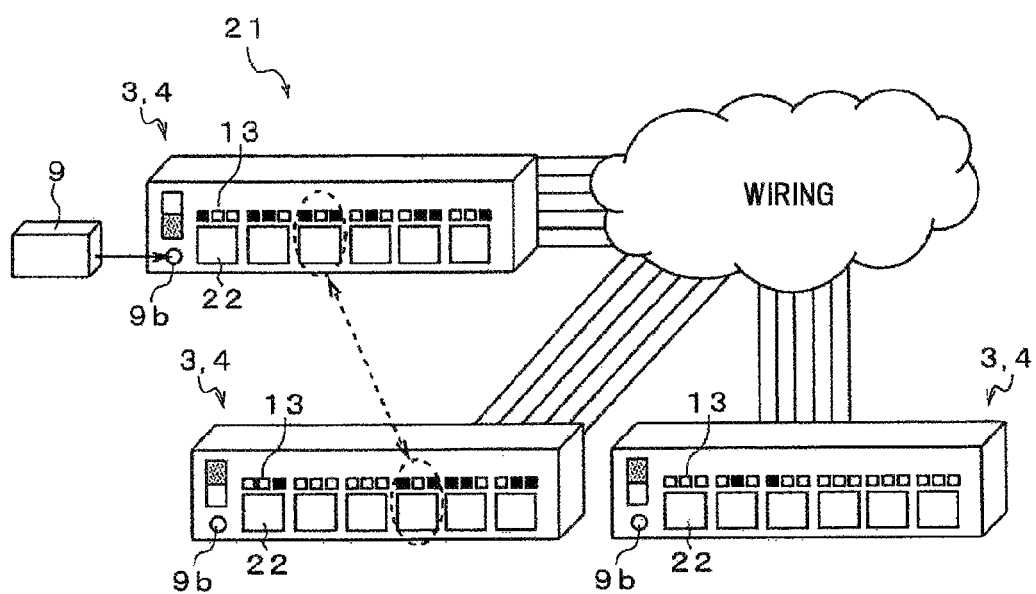
FIG. 3 is an illustration diagram showing an application example of the communication monitoring device shown in FIG. 2A.

A communication monitoring device 21 shown in FIG. 2A and FIG. 3 comprises repeaters 3 and 4 having a plurality of ports 22 to connect communication cables 2. The repeaters 3 and 4 comprise voltage application circuits 5 and 8, display portions 6 and 7, and filters 15 and 16 by each of the ports 22.

In the communication monitoring device 21, the voltage application circuits 5 and 8 are configured so as to apply the alternating current voltages at different frequencies by each of the ports 22. In this case, as each of the repeaters 3 and 4 has six ports 22, each of the frequencies which the voltage application circuits 5 and 8 mounted on each of the ports define f1 to f6 oscillate. The frequencies f1 to f6 need to differ from the frequency fc from the electric signal transmitted in the communication cable 2. And it is preferable to set each of the frequencies f1 to f6 as small as possible and decrease power consumption.

The filters 15 and 16 are configured so as to cut the alternating current signals at the frequencies f1 to f6.

Moreover, in the communication monitoring device 21, the display portions 6 and 7 are configured so as to display different indications by each of the frequencies f1 to f6 for the alternating current voltages applied between the any pair of the signal lines 2a in the communication cable 2. In this case, each of the display portions 6 and 7 comprises three LEDs D1 to D3, and is configured so as to change a pattern of emitting the LEDs D1 to D3 by the frequencies f1 to f6.

Figure 2B:
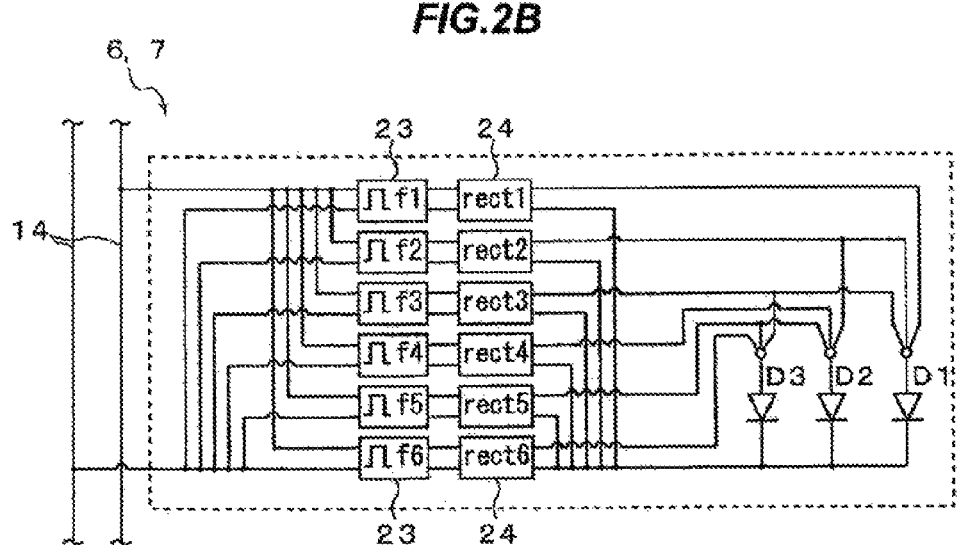
FIG. 2B is a circuit diagram showing the configuration example of a display portion in the communication monitoring device in the other embodiment according to the invention.

In particular, shown in FIG. 2B, each of the display portions 6 and 7 comprises six display side filters 23 to pass only the alternating current signals at the frequencies f1 to f6 respectively, six rectifier circuits (rect) 24 corresponding to each of the six display side filters 23, and the three LEDs D1 to D3. The display portions 6 and 7 are configured so as to change indicate by each of the frequencies f1 to f6 by emitting output voltages in each of the. rectifier circuits 24 to emit the three LEDs D1 to D3 with different patterns. Concerning the circuit configuration shown in FIG. 2B, Table 1 shows the patterns of the LEDs D1 to D3 emitted in each of the frequencies f1 to f6.

TABLE 1

| Frequency | Patterns of LED emitted | | |
|---|---|---|---|
| | D1 | D2 | D3 |
| f1 | emitted | — | — |
| f2 | emitted | emitted | — |
| f3 | emitted | — | emitted |
| f4 | — | emitted | — |
| f5 | — | emitted | emitted |
| f6 | — | — | emitted |

Further, FIG. 2B shows the rectifier circuits simplify. As it is assumed that the LEDs D1 to D3 emit unintentionally by backflow currents in the line connecting between the rectifier circuits 24 and the LEDs D1 to D3, it is preferable to add diodes suitably to suppress backflow currents.

According to the configuration described above, shown in FIG. 3, a pattern of emitting the LEDs D1 to D3 in same indicates a connection between the repeaters 3 and 4 each other and the connection destination of the port 22 can be confirmed more easily.

Further, in this case, adopting the three LEDs D1 to D3, the connection destination of the connection can be confirmed by the pattern of emitting the LEDs D1 to D3. It is not limited thereto, for example, six LEDs corresponding to the six ports 22 may be displayed simply, or without using the LEDs, adopting inductors include displays which show each of characters such as numbers, letters, and signs by each of the frequencies may be indicated. However, the display portions 6 and 7 adopted such as the display are expensive. And it is useless to use the LEDs as many as the number of the ports 22. It is preferable to display by the pattern of emitting the LEDs from a view of cost.

The invention is not to be limited to the embodiments described above, and, of course, the various kinds of modifications can be implemented without departing from the gist of the invention.

For example, in the embodiments described above, as the repeater 3 mounts the first voltage application circuits 5 and the first display portion 7, the invention is not to be limited, e.g. the first voltage application circuit 5 and the first display portion 7 can be mounted on the first connector 2b arranged at one end of the communication cable 2 generally, or mounted on a first communication device such as a switching hub or a server, connected the first connector 2b.

As well, the second voltage application circuit 8 and the second display portion 6, the invention is not to be limited to mount on the second repeater 4, can be mounted on the second connector 2c arranged at the other end of the communication cable 2 generally, or mounted on a second communication device such as the switching hub or the server connected the second connector 2b.

What is claimed is:

1. A communication monitoring device, comprising:
   a first voltage application circuit, mounted on a first connector portion arranged at one end of a communication cable having at least two signal lines or on a first repeater or a first communication device, connecting the first connector portion, wherein the first voltage application circuit applies an alternating current voltage at a predetermined frequency to between any signal lines in the communication cable; and
   a second display portion, mounted on a second connector portion arranged at an other end of the communication cable, or on a second repeater or a second communication device, connecting the second connector portion, wherein the second display portion detects and displays the alternating current voltage at the predetermined frequency applied to between any signal lines in the communication cable.

2. The communication monitoring device according to claim 1, further comprising a first display portion mounted on the first connector portion, the first repeater or the first communication device,
   wherein the first display portion detects and displays the alternating current voltage at the predetermined frequency applied to between the any signal lines in the communication cable.

3. The communication monitoring device according to claim 2, further comprising a second voltage application circuit mounted on the second connector portion, the second repeater or the second communication device,
   wherein the second voltage application circuit applies the alternating current voltage at the predetermined frequency to between the any signal lines in the communication cable.

4. The communication monitoring device according to claim 1, wherein the first voltage application circuit comprises a plurality of first voltage application circuits that are mounted on the first repeater or the first communication device, having ports to connect the communication cable, with respect to each port, and applies the alternating current voltages at the different frequencies with respect to the each port; and wherein the second display portion comprises a plurality of second display portions that are mounted on the second repeater or the second communication device, having ports being connected with the communication cable, with respect to each port, and displays different indications with respect to the different frequencies of the alternating current voltage applied at between the any signal lines in the communication cable.

5. The communication monitoring device according to claim 1, further comprising:

a first filter arranged in the first connector portion, the first repeater or the first communication device, wherein the first filter suppresses an alternating current voltage applied by the first voltage application circuit with outputting forward a transmission line being opposite side of the communication cable; and a second filter arranged in the second connector portion, the second repeater or the second communication device, wherein the second filter suppresses the alternating current voltage applied by the first voltage application circuit with outputting forward a transmission line being opposite side of the communication cable.

6. The communication monitoring device according to claim 1, wherein a frequency of an alternating current voltage applying to between the any lines in the communication cable is lower than a frequency of an electric signal transmitted in the communication cable.

7. The communication monitoring device according to claim 1, further comprising a power feeding device arranged separately from the first connector portion, the first repeater, or the first communication device, mounted on the first voltage application circuit, wherein the first voltage application circuit applies the alternating current voltage at a predetermined frequency between any signal lines in the communication cable with supplied power from the power feeding device.

* * * * *